July 15, 1952
R. J. COLE ET AL
2,603,688
APPARATUS FOR MEASURING WIRE AND THE LIKE
Filed Nov. 6, 1947
2 SHEETS—SHEET 1
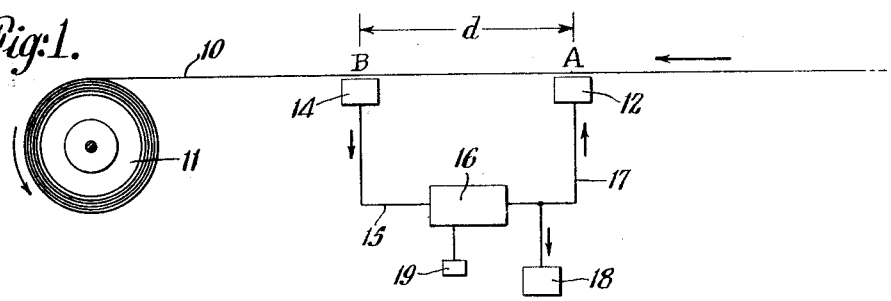
Fig:1.
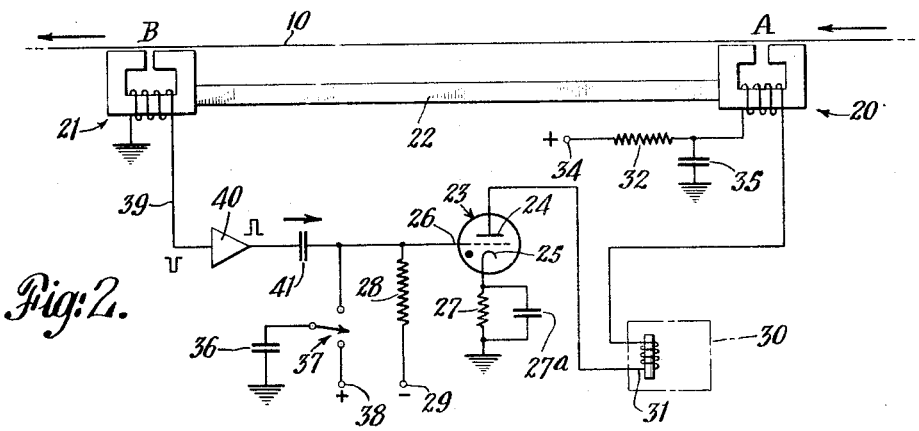
Fig:2.
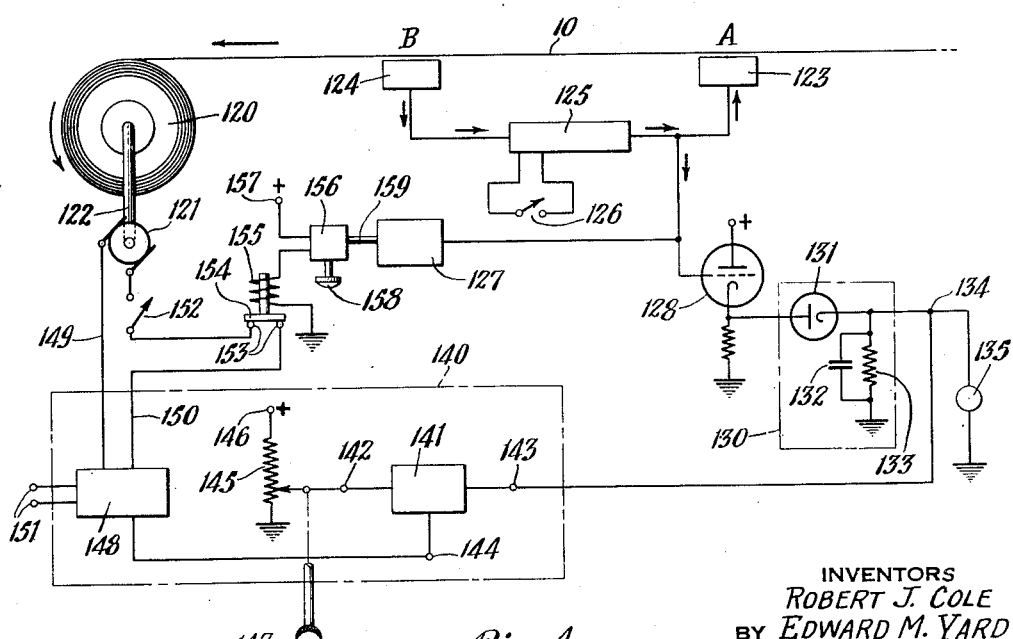
Fig:4.
INVENTORS
ROBERT J. COLE
BY EDWARD M. YARD
John Farley
ATTORNEY

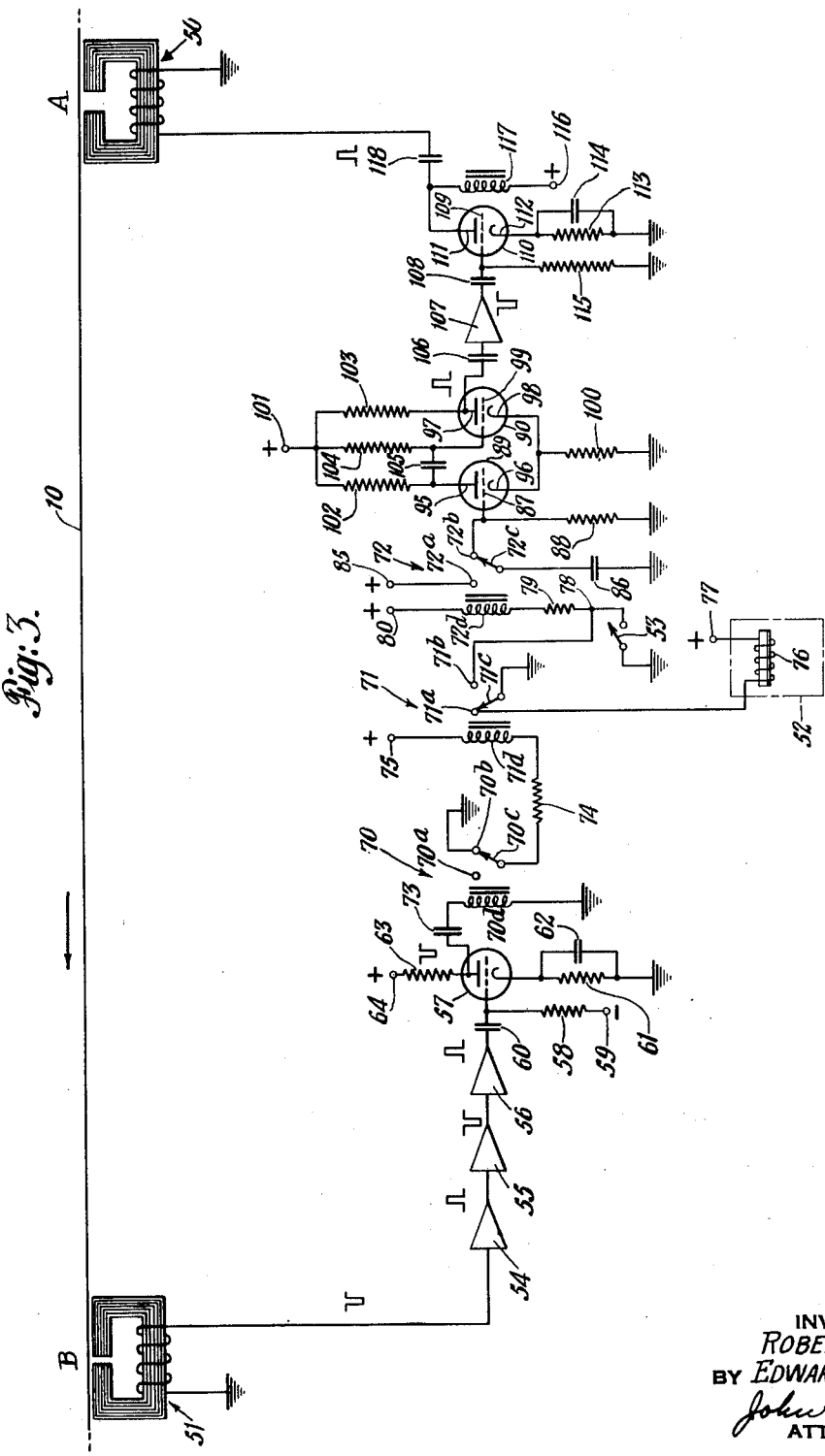

Patented July 15, 1952

2,603,688

UNITED STATES PATENT OFFICE 2,603,688

APPARATUS FOR MEASURING WIRE AND THE LIKE

Robert J. Cole, Yardley, Pa., and Edward M. Yard, Trenton, N. J., assignors to John A. Roebling's Sons Company, Trenton, N. J., a corporation of New Jersey Application November 6, 1947, Serial No. 784,392

1 Claim. (Cl. 175—183)

This invention relates to apparatus and a method for measuring the length of elongated material as it advances, and is particularly applicable for measuring, at a given station, the length of ferromagnetic wire and the like, advancing continuously at high speed past said station. In addition to its use to measure length, the invention may be used to measure or to control the speed of the advancing material.

In the manufacture of wire, particularly during certain reeling operations, it is frequently desired to measure, as the wire advances, the length of wire wound up on a spool, with considerable accuracy. A typical speed of reeling may be, for example, 1000 feet per minute. At such speeds, mechanical apparatus for measuring the length of the wire is subject to various difficulties. For example, such apparatus may apply undue tension to the wire.

A primary object of the present invention is to provide electromagnetic means and a method for measuring the length of wire and the like while it advances at a rapid rate. It will be understood that the invention may be used for measuring not only single wires of different shapes in cross-section but also wire strand, rope, ribbon, cable, and the like, of ferromagnetic material.

A feature of one embodiment of the present invention is that it is capable of measuring the wire without touching the wire, and hence without impeding the advancing motion of the wire.

Another object of the present invention is to provide, in combination with electromagnetic means for measuring wire as it is being reeled, means for stopping the reeling operation when a predetermined length of wire has been reeled.

Another feature of the present invention is that it is capable of measuring accurately the length of ferromagnetic filamentary material, regardless of the size or shape of the cross section of the material.

Another object of the present invention is to provide apparatus and a method for measuring the velocity of advancing ferromagnetic filamentary material.

Another object of the present invention is to provide a speed-controlling apparatus and method for use in reeling wire and the like.

The above-mentioned, as well as other objects, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein:

Fig. 1 is a schematic block diagram of length-measuring apparatus embodying the features of the present invention.

Fig. 2 is a simplified circuit diagram of a length-measuring apparatus.

Fig. 3 is a circuit diagram of a somewhat more complex length-measuring apparatus.

Fig. 4 is a semi-schematic diagram of apparatus capable of performing the functions of measuring the length of wire as it advances during a reeling operation, measuring the velocity of the wire, controlling the speed of reeling so that the linear velocity of the wire is constant, and stopping the reeling operation when a predetermined length of wire has been reeled.

In one embodiment of the present invention for measuring the length of ferromagnetic wire while said wire is being advanced along a path, there is provided an electromagnetic recorder head positioned at a first station on said path for magnetizing portions of said wire such as short, spaced, elementary lengths of same. An electromagnetic pick-up head is positioned at a subsequent station on said path, displaced from the recorder head by a predetermined, known distance. The pick-up head is adapted to generate electrical signals, such as pulses, in response to passage of magnetized portions of the wire past the second station. Connected to the pick-up head and responsive to the electrical signals from same are electrical circuit means which are also connected to the recorder head, for energizing same. These electrical circuit means may comprise a repeater such as a controlled pulse generator, triggered or controlled by pulses from the pick-up head. A counter, responsive to electrical signals from the repeater, is provided for indicating the length of wire passing the device.

The operation of such a device may be as follows. An initiator may first be operated to cause the recorder head to magnetize a spot on the wire. As the wire advances and this spot passes the pick-up head, an electrical pulse is generated by this head. As a result, the repeater energizes the counter and applies an electrical pulse to the recorder head, thereby magnetizing another spot on the wire. This spot is in turn advanced to the pick-up head, and successive cycles of operation continue as long as the wire is advanced. Thus a pulse will be generated each time the wire advances a distance equal to the known distance between the recorder head and the pick-up head. The counter, which indicates the number of pulses generated by the pick-up head, therefore indicates the number of known lengths of wire passing the device, or may be calibrated to indicate directly the length of wire passing the device.

Reference is made to Fig. 1. The invention is illustrated as it might be used in connection with reeling a continuous wire 10 onto a driven spool or reel 11. The wire 10 may be assumed to be of ferromagnetic material, such as a plain carbon steel. There is provided a recorder head 12 positioned adjacent the wire at a station A in the path of travel of the wire. The recorder head, which will later be described in more detail, comprises an electromagnet adapted to produce, when energized, a magnetic field in a small region in the path of the wire 10, of sufficient strength to magnetize an elementary length of the wire.

In the present illustration it may be assumed that the recorder head 12 is oriented so that it magnetizes the wire 10 chiefly longitudinally. It is possible, however, to modify the device so that the magnetic flux of the recorder head passes transversely through the wire, and in this case the wire would of course become magnetized transversely. The magnetic field produced by the recorder head will vary with time in a manner dependent upon the current applied to the head. If this current is a series of separate pulses, and if the wire is advanced continuously, then the wire will be magnetized in a series of spaced elementary regions.

The recorder head 12 may be carried by a frame, not shown in Fig. 1, and there is provided a pick-up head 14, also carried by this frame, located at a station B in the path of travel of the wire 10, separated from the recorder head by a predetermined, known distance $d$. The pick-up head 14 which will be described in more detail at a later point, is somewhat similar to the recorder head except that it is adapted to perform the reverse function, that is, to produce an electrical pulse when a magnetized portion of the wire 10 passes by the station B.

Connected to the pick-up head 14 by a lead 15 there is provided electrical circuit means which may comprise a controlled pulse generator 16. This pulse generator is responsive to electrical pulses derived from the pick-up head 14 and in a preferred form of the invention, provides an amplified output pulse for each pulse derived from the pick-up head 14. The output pulses from the pulse generator 16 are applied, through a lead 17, to the recorder head 12. Thus when a magnetized portion of the wire 10 passes the pick-up head 14, an electrical pulse is applied by this head to the repeater 16, which in turn applies an electrical pulse to the recorder head, thus magnetizing another spot on the wire. In one embodiment of the invention, the output pulse from the repeater 16 is of constant duration and wave form, regardless of the duration or wave form of the pulse applied to this repeater.

There is provided a counter 18, which may be connected to the output terminal of the repeater 16, adapted to provide an indication proportional to the number of pulses derived from the pick-up head. In a modified embodiment, the counter could be provided with a separate pick-up head, together with suitable amplifying means.

The apparatus is provided with initiator means 19, adapted to cause the recorder head 12 to be energized once initially when the measuring operation is begun. This initiator may comprise means for triggering the controlled pulse generator 16 once, as will be illustrated subsequently in more detail. The initiator may conveniently be arranged as a portion of means for starting a motor, not shown in Fig. 1, which drives the reel 11.

In summary, operation of the embodiment illustrated in Fig. 1 may be described as follows: The initiator 19 is first actuated, causing an electrical pulse to be applied by the controlled pulse generator or repeater 16 to the recorder head 12, thereby magnetizing a first spot on the wire 10. The counter 18 may have been previously adjusted so that this first pulse brings the counter up to the zero reading. The reel 11 is started, and the wire 10 is caused to advance to the left in Fig. 1, as it is wound up on the reel. When the first magnetized portion of the wire passes the pick-up head 14, an electrical pulse is applied by this head to the repeater or controlled pulse generator 16, which in turn applies a pulse to the recorder head 12 and a pulse to counter 18. If the length of wire passing the apparatus is denoted by the symbol $l$, and the number of counts recorded by the counter 18, by the symbol $n$, then the following relation is observed to hold:

$$l = nd$$

where $d$ is the known distance separating the recorder head at station A from the pick-up head at station B, as previously indicated. By proper calibration, the counter may be caused to indicate length directly.

Reference is made to Fig. 2, which represents an embodiment of the device described in connection with Fig. 1, featuring a controlled pulse generator comprising a gaseous discharge tube, normally biased off, together with means for causing a temporary discharge through the tube. In Fig. 2 there is shown a recorder head 20, and a pick-up head 21, supported adjacent the path of the wire 10 and separated from each other a predetermined distance by a frame 22. These heads are generally in the nature of electromagnets, comprising a yoke of magnetic material, on which is wound a coil comprising a current path. Each yoke is provided with an air gap in a region adjacent the wire 10. Performance is somewhat better if the air gap for the recorder head 20 is longer than the air gap for the pick-up head 21. When the recorder head 20 is energized by current flowing through its coil, magnetic flux is induced around the yoke, and at the air gap this magnetic flux has a tendency to spread into the adjacent region. As a result, magnetic flux passes through the wire 10 at the station A, causing same to become magnetized with some degree of permanence.

When this magnetized portion of the wire 10 passes the pick-up head 21, it causes magnetic flux to be set up around the yoke of this head. As a result, there is a change in the flux linking the coil wound on this yoke, and hence a voltage is generated across this coil. It may conveniently be assumed that the electrical pulse thus generated is of quite short duration. More particularly, the length of the magnetized portion of the wire, the speed of the wire, and the length of the air gap in the pick-up head are so related that the electrical pulse derived is of short duration compared to the time constants of the A.-C. coupled circuits into which it is fed.

There is provided a gas tube 23 having an anode 24, a cathode 25 and a grid 26. The cathode 25 is connected to ground through a resistor 27, and a parallel capacitor 27a. The grid 26 is connected through a resistor 28 to a source of negative bias potential at a terminal 29, sufficiently negative to prevent initiation of a discharge through the tube, in the absence of other potentials applied to the grid circuit.

There is provided a pulse counter 30 of the type actuated by a solenoid 31. The plate circuit of the tube 23 includes, in series circuit relation, the coil of the solenoid 31, the coil of the recorder head 20, a large resistor 32, and a source of positive potential at a terminal 34. The terminal of the resistor 32 opposite the terminal 34 is connected through a large capacitor 35 to ground. This resistor and capacitor comprise a circuit for extinguishing conduction through the tube 23 following a pulse, as will be described.

As part of the initiator, there are provided connections for temporarily applying a positive potential to the grid 26 of the tube 23, including a capacitor 36 having one plate grounded and the other plate connected to an arm of a switch 37. One contact of the switch 37 is connected to a source of positive potential at a terminal 38, and the other contact is connected to the grid 26. The switch arm is normally held, as by spring means not shown, in the down position, to cause the capacitor 36 to become charged from the terminal 38.

As previously indicated, the tube 23 is normally non-conducting. At the start of a measuring operation, the operator temporarily throws the arm of the switch 37 into the up position, causing the capacitor 36 to discharge through the resistor 28, thereby temporarily driving the grid 26 toward a positive potential. The change in potential of the grid 26 is sufficient to initiate conduction through the plate circuit of the recorder head 20 and the solenoid 31. The recorder head 20 magnetizes a spot on the wire 10, and the solenoid 31 causes the counter 30 to operate once. At the beginning of the discharge through the tube 23, a considerable portion of the tube current is drawn from the capacitor 35, which had previously been charged. This capacitor is rather quickly discharged, however, because of the low tube impedance typical of gas tubes during discharge, and a considerable current is caused to flow through the large resistor 32. The flow of plate current through the large resistor 32 causes a drop in the effective plate supply voltage, and at the same time, the flow of current through the resistor 27 causes a rise in the potential of the cathode. The capacitor 27a tends to maintain the cathode at a positive potential. The plate-to-cathode voltage consequently decreases below that necessary to maintain conduction through the tube, and the discharge is extinguished. It may be seen that the duration of the discharge through the tube 23 is dependent upon circuit constants such as the size of the resistor 32 and the capacitor 35, and is substantially independent of the duration of a positive voltage applied to the grid.

One end of the coil of the pick-up head 21 is grounded, and the other end thereof is connected through a lead 39 to the input terminal of an amplifier 40. The output terminal of this amplifier is connected through a blocking capacitor 41 to the grid 26 of the tube 23. The windings of the coils of the recorder and pick-up heads, and the stages of amplification between the pick-up head and the grid 26 are so arranged that when a magnetized portion of the wire reaches the pick-up head, the grid 26 is driven positively. The positive voltage pulse thus applied to the grid is sufficient to fire the tube, causing the cycle to be repeated. The indication of the counter 30 is an indication of the length of wire passing the device, as has previously been explained.

In case it is desired to improve operation of the system of Fig. 2 at high speeds, by aiding in extinguishing the tube 23 following a pulse, a capacitor may be connected in parallel with the series combination represented by windings of the counter 30 and the recorder head 20, adapted to provide an oscillatory parallel circuit, tuned to approximately the pulse repetition rate. This arrangement has the effect of assuring that the anode 24 of the tube 23 will be driven sufficiently negative to extinguish the tube.

Reference is now made to Fig. 3. In this figure there are shown a recorder head 50 and a pick-up head 51. As shown, the yokes of these heads may be laminated, in order to reduce eddy currents, and improve the efficiency of the devices. Between the pick-up head 51 and the recorder head 50 there is provided circuit means which may be considered to comprise a pulse repeater circuit. There is also provided a counter 52 responsive to this circuit, and an initiator 53 for energizing same at the start of operations.

One end of the coil of the pick-up head 51 may be grounded, and the other end of this coil is connected to the first of a series of amplifiers 54, 55 and 56. These amplifiers serve the purpose of amplifying pulses received from the pick-up head, and by limiting effects, causing the output pulses from the amplifier 56 to have rather steep leading edges, and to be of generally uniform amplitude. The polarity of the voltage pulse, in this illustrative embodiment, is shown at various points of the circuit in Fig. 3.

There is provided a tube 57 having its grid normally biased below cutoff, being connected through a resistor 58 to a source of negative bias potential at the terminal 59. The windings of the recorder and pick-up heads, and the stages of amplification are so arranged that when a magnetized spot of the wire 10 passes the pick-up head 51, a negative voltage pulse is applied to the input terminal of the amplifier 54, and a positive voltage pulse appears at the output terminal of the amplifier 56. This output terminal is connected through a blocking capacitor 60 to the grid of the tube 57. The cathode of the tube 57 may be connected through a resistor 61, in parallel with capacitor 62, to ground. The plate of this tube is connected through a resistor 63 to a positive potential source or B supply at a terminal 64. Since the tube is normally biased off, the plate will normally be at the positive potential of the B supply. When a positive pulse is applied to the grid of the tube 57, the potential of the plate of this tube will drop quickly as the tube begins to conduct and at the termination of the pulse on the grid, the plate will again rise in potential.

There are provided a series of three non-polarized relays, 70, 71, and 72, having rear contacts 70a, 71a, and 72a, forward contacts 70b, 71b, and 72b, movable contact arms 70c, 71c, and 72c, and control coils or windings 70d, 71d, and 72d, respectively. The relays are all provided with springs, not shown, adapted to urge their movable contact arms into the rear position, that is, toward the contacts 70a, 71a, and 72a.

The plate of the tube 57 is connected through a blocking capacitor 73 to one end of the winding 70d, the other end of which is grounded. The rear contact 70a of the relay 70 is open-circuited, and the front contact 70b is grounded.

The contact arm 70c is connected in series circuit relation with a resistor 74, the winding 71d, and a source of potential at a terminal 75, in the order named.

The rear contact 71a of the relay 71 is connected to one end of the winding 76 of the counter 52, the other end of this winding being connected to a source of potential at a terminal 77.

The movable arm 71c of the relay 71 is grounded. The forward contact 71b of the relay 71 is connected at a point 78 to one terminal of the initiator switch 53, the other terminal of this switch being grounded. The point 78 is connected in series with a resistor 79, the winding 72d of the relay 72, and a source of potential at a terminal 80, in the order named.

The rear contact 72a of the relay 72 is connected to a source of positive potential at a terminal 85. This potential may, for example, be of the order of 100 volts.

There is provided a capacitor 86, which may conveniently be of the order of 0.002 microfarad, for example, having one plate connected to the movable arm 72c and its other plate grounded. The forward contact 72b is connected to a grid 87 of a multivibrator circuit, to be described, and is connected through a resistor 88 to ground. This resistor may conveniently be approximately 500,000 ohms. When the arm 72c is in the rear position, the capacitor 86 becomes charged from the positive potential source at the terminal 85, and when the arm 72c is switched to the forward position, the capacitor 86 applies a temporary positive potential to the grid 87, and discharges through the resistor 88.

There is provided a multivibrator circuit of the single shot type, including a pair of tubes 89 and 90. This multivibrator is, per se, conventional in construction, but will be described in detail for the sake of completeness. The tube 89 is provided with a plate 95, a cathode 96 and the grid 87, previously mentioned. The tube 90 is provided with a plate 97, a cathode 98 and a grid 99. The cathodes 96 and 98 are connected together, and are connected through a common cathode resistor 100 to ground. The plate 95, the plate 97, and the grid 99 are connected to a positive B supply terminal 101 through resistors 102, 103 and 104, respectively. The plate 95 is coupled to the grid 99 through a capacitor 105.

When the multivibrator is in its quiescent condition, the tube 90 conducts strongly, since its grid is held at a positive potential because of being connected through resistor 104 to the terminal 101. The potential at plate 97 is therefore considerably below the B supply potential. The tube 89, on the other hand, normally is substantially cut off, since the grid 87 is substantially at ground potential, and the cathode 96 is held at a considerable positive potential because of the conduction through the resistor 100 due to the plate current of the tube 90. When a positive pulse is applied to the grid 87, the tube 89 starts to conduct, and the plate 95 consequently drops in potential, forcing the grid 99 down in potential, and cutting off the tube 90. As a result, the potential of the plate 97 rises sharply. The capacitor 105 now gradually charges, its left-hand plate being held somewhat below the B supply potential because of the voltage drop through the resistor 102, and its right-hand plate rising gradually toward the B supply potential. The grid 99, which is connected to the right-hand terminal of the capacitor 105, is thus gradually raised in potential, until it again causes the tube 90 to conduct. The increased cathode current raises the potential of the cathode 96, cutting off the tube 89, and returning the multivibrator to its original quiescent condition. The plate 97 drops again in potential when the tube 90 again conducts, forming the trailing edge of the output pulse from the multivibrator. It may be observed that the duration of the pulse generated by the multivibrator is determined by the circuit constants of the multivibrator, and not by the wave form of the pulse applied to the grid 87.

The plate 97 of the multivibrator circuit is connected through a blocking capacitor 106 to an amplifier 107 and thence through a blocking capacitor 108 to a grid 109 of a power amplifier tube 110. This tube is provided with a plate 111 and with a cathode 112 connected to ground through a resistor 113 and a parallel by-pass condenser 114. The grid 109 is connected to ground through a resistor 15. The plate circuit of the tube 110 is supplied with current from a B supply terminal 116 by a shunt feed, comprising an inductor 117, connected between the terminal 116 and the plate 111. The plate 111 is connected through a blocking capacitor 118 to one end of the winding of the recorder head 50, the other end of which is grounded.

The relays 70, 71, and 72 are all so arranged that when a current flows through their respective windings, their movable arms are urged toward their contacts 70a, 71a and 72a. On the other hand, as previously indicated, when no current flows through their windings, these arms are urged by spring means toward the forward contacts 70b, 71b, and 72b. When the apparatus is in a quiescent condition, no current is supplied to the winding 70d of the relay 70, and hence its movable arm is in the forward position. This completes a current path from the potential source at the terminal 75, through the winding 71d, the resistor 74, the switch arm 70c, the contact 70b, to ground, and hence the winding 71d is energized, thereby holding the switch arm 71c in the rear position, so as to engage the contact 71a. Under this condition a steady direct current flows through winding 76 of the counter 52. The winding 72d of the relay 72 is normally open-circuited, and hence the movable arm 72c is normally in the forward position, engaging the contact 72b.

The operation of the embodiment shown in Fig. 3 may now be summarized. At the start of operations, the initiator switch 53 is temporarily closed by the operator. A current path is thus temporarily established from the potential source at the terminal 80 through the winding 72d, the resistor 79, and the switch 53, to ground, thus temporarily energizing the winding 72d and throwing the switch arm 72c into the rear position, engaging the contact 72a. The capacitor 86 becomes charged almost instantaneously to the positive potential of the terminal 85, and when the switch 53 is opened by the operator, de-energizing the winding 72d, the capacitor 86 is connected by the switch arm 72c to the contact 72b. This contact may be considered to comprise an output terminal for the capacitor 86. The capacitor 86, as it discharges through the resistor 88, thus applies to the grid 87 of the multivibrator circuit a positive pulse which serves to trigger the multivibrator, causing it in turn to deliver a positive pulse of fixed duration to the amplifier 107 and thence to the power amplifier tube 110. The power amplifier in turn causes the recorder head 50 to magnetize a spot on the wire.

When the spot on the wire 10 magnetized by the recorder head 50 passes the pick-up head 51, a negative voltage pulse is applied by this pick-up head to the input terminal of the amplifier 54. A positive pulse is as a result applied to the grid of the tube 57, which tube is as previously stated normally biased off. Upon the appearance of this positive pulse at the tube 57, this tube conducts briefly, energizing the winding 70d of the relay 70 for a short interval. When this relay is energized, its movable arm 70c is thrown into the rear position so as to engage the contact 70a, thereby opening the current path through the winding 71d of the relay 71, de-energizing this relay. As a result, the spring of this relay urges its contact arm into the forward position to engage the contact 71b. This motion of the contact arm 71c has two effects. It opens the circuit through the winding 76 of the counter 52, and it completes a circuit through the winding 72d of the relay 72. Upon termination of the pulse from the pick-up head 51, the movable arms of the relays are returned to their positions as shown in Fig. 3.

One feature of the system of Fig. 3 is that when the initiator switch 53 is closed, the recorder head is actuated, but the counter is not actuated. This feature simplifies the problem of initially setting the counter. Thus the counter may be initially set at zero, and it will be first energized when the wire has advanced by a distance corresponding to the separation of the heads. One complete operation of the counter takes place when the winding of its solenoid is de-energized, and then again energized.

In Fig. 3, the leading edge of the pulse throws the movable arm 71c to the right or forward position, de-energizing the winding 76 of the counter 52, and causing the counter to perform a reaching stroke, and the trailing edge of the pulse energizes the winding 76, causing the counter to perform a driving stroke, so as to advance the length-indicating means of the counter.

This stroke of the counter 52 in Fig. 3 is slightly different from that of the counter 30 in Fig. 2. The winding 31 of the counter 30 in Fig. 2 is normally de-energized. It is energized when the tube 23 fires upon the occurrence of the leading edge of the pulse, and is de-energized when the tube 23 is extinguished, thereby performing one complete operation or count.

Reference is made to Fig. 4, wherein there is shown in an illustrative embodiment a system employing the teachings of the present invention in wire reeling apparatus featuring means for indicating and controlling the speed at which the wire is being reeled, as well as for indicating and controlling the length of wire reeled.

In this system there is provided a reel 120 on which the wire 10 is being wound, and a motor 121 adapted to drive the reel 120 through a shaft or other mechanical linkage schematically indicated at 122. A recorder head 123, and a pick-up head 124, separated from one another by a predetermined distance, are located adjacent the wire 10. There is provided a repeater such as a pulse repeater circuit 125, responsive to the pick-up head and adapted to actuate the recorder head, and an initiator switch 126 for initially actuating the pulse repeater circuit. The pulse repeater circuit is of the type adapted to provide an output pulse the wave form of which is independent of the wave form or duration of the pulse applied to the input of said circuit. Thus if a series of pulses is applied to the repeater 125, the output pulses from the repeater 125 will all be similar to one another in amplitude, wave form and duration. The illustrative pulse repeater circuits shown in Figs. 2 and 3 have these characteristics, and may sometimes be referred to as single-shot pulsing circuits, or single-shot pulse generators, because they produce a single output pulse for each input pulse applied to them.

Connected to the output terminal of the pulse repeater 125 is a pulse counter 127, adapted to indicate the length of the wire advancing past said heads, in a manner similar to the action of the counters of Figs. 1–3, inclusive.

Also connected to the output terminal of the pulse repeater circuit 125, and responsive to the pulses therefrom, is means for deriving a voltage determined by the repetition rate of said pulses. Such means may include a cathode follower 128 and a detector 130. The detector 130 in the illustration comprises a rectifier 131 in series with a parallel circuit comprising a capacitor 132 and a resistor 133. The cathode follower provides a low output impedance and a high input impedance so that the detector and circuits associated therewith will not unduly load the pulse repeater circuit. The detector 130 is of the averaging type. That is, it provides an output voltage proportional to the average value of a periodic input voltage to this detector. The input voltage to the detector in the present illustration comprises a series of like positive pulses having a repetition rate determined by the velocity of the wire 10. The shape of the pulses is independent of the wire velocity. During occurrence of a pulse, the condenser 132 charges, and during the portion of the cycle between pulses, this condenser partly discharges through resistor 133. If the wire moves rapidly, pulses will be applied to the detector in quick succession, and the portion of cycle when the condenser 132 is allowed to discharge will be somewhat less than is the case when the wire is moving slowly. The output voltage from the detector 130 will thus comprise a D.-C. voltage determined by the repetition rate of the pulses, and therefore determined by the velocity of the wire 10.

In a different embodiment, it would be possible to employ, instead of a detector 130 of the averaging type, any other device adapted to produce a voltage determined by the repetition rate of the pulses from the pulse repeater circuit.

Connected to the output terminal 134 of the detector is an indicator device 135, such as a D.-C. voltmeter, calibrated to read the velocity of the wire.

The voltage from the terminal 134 may also be used to control the speed of reeling. For this purpose there may be provided a voltage-sensitive speed controller 140 adapted to control the speed of reeling the wire by controlling the motor 121. The voltage from the point 134 is applied to the controller 140, which in turn controls the energizing current of the motor 121. The speed controller 140 may in turn comprise a voltage comparison circuit 141, having a first input terminal 142, a second input terminal 143 and an output terminal 144. This comparison circuit, which may be of a known type, is adapted to produce at the terminal 144 a D.-C. voltage proportional to or determined by the difference between the voltages applied at the input terminals 142 and 143. The voltage at the output terminal 144 may be known as an error voltage. Applied to the terminal 142 is a voltage adapted to control the reeling speed to which the system adjusts itself. For this purpose, there is provided a potentiometer 145 one end of which is grounded and the other end of which is supplied with a positive D.-C. potential at a terminal 146. The slider of the potentiometer is connected to the terminal 142. A manual control 147 is adapted to adjust the position of the slider, thereby controlling the voltage applied to the terminal 142, for adjusting the speed of reeling.

The terminal 134 is connected with the terminal 143, and there appears at the terminal 144 a D.-C. voltage determined by the difference between the actual velocity of the wire, as indicated by the voltage at the terminal 134, and the desired velocity of the wire, as indicated by the voltage at the terminal 142. As part of the voltage-sensitive speed controller 140, and connected to the terminal 144, there is provided a motor control device 148, adapted normally to supply energizing current to the motor 121 through a pair of leads 149 and 150 and adapted to alter this energizing current in accordance with any error signal from the terminal 144. The control device is itself supplied with energizing current at a pair of terminals 151. A switch 152 is shown in the lead 150, schematically illustrating means for starting the motor. Of course in actual operation the starting mechanism would be considerably more refined.

Means are provided for automatically stopping the reeling operation after a predetermined length of wire has been reeled. For this purpose there is shown switch means adapted to open a circuit in the lead 150, a relay for controlling this switch means, and means responsive to the counter 127 adapted to control the relay. Comprising the switch means, there is provided a pair of contacts 153 and a movable contactor 154 engaging same, having an armature attached thereto. There is provided a solenoid winding 155, adapted to move the armature upwardly when energized, thereby picking up the contactor 154 and opening the circuit in the lead 150, thus stopping the motor 121. The current supply to the winding 155 is in turn controlled by a length control device 156. This device includes switch means in series circuit relation with a source of positive potential at a terminal 157, the winding 155, and a ground connection for this winding, and also includes a rotatable shaft 159 for controlling said switch means to complete the current supply circuit of the winding 155 when the shaft 159 has rotated through a predetermined distance. The shaft 159 is driven, with intermittent rotation, by the counter 127, and in fact it may be considered to comprise an extension of the shaft of the counter which carries the rotary indicating device of the counter. It may thus be seen that when a predetermined length of wire has been reeled, the counter 127 will have rotated the shaft 159 through a corresponding distance, thereby causing the length control device 156 to close the current supply circuit to the winding 155, which winding in turn lifts the contactor 154, and opens the current supply circuit to the motor 121, so as to stop the reel. The length control device 156 is provided with a manually adjustable control 158 adapted to adjust the switch means in the device so as to determine the distance through which the rotary shaft 159 must turn in order to energize the winding 155. Hence the control 158 is adapted to determine the length of wire to be reeled before the motor is automatically stopped.

The operation of the device shown in Fig. 4 may be summarized as follows. The manual speed control 147 is initially adjusted to a setting corresponding to the speed desired for the reeling operation. The control 158 is adjusted to a setting corresponding to the length of wire desired to be reeled. The initiator 126 is operated to cause the recorder head to magnetize a first spot on the wire. The starting switch 152 is then closed to cause the reeling operation to start. While the wire velocity is below the desired speed, the D.-C. voltage available at the terminal 134 will be smaller than that available at the terminal 142, and therefore an error signal will appear at the terminal 144 adapted to cause the motor control 148 to cause the motor to accelerate.

When the reeling operation is proceeding at the desired speed, the voltage at the terminal 134 will be equal to that at the terminal 142, and the potential at the terminal 144, applied to the motor control 148, will be that corresponding to zero error. Under this condition the motor control is adapted to energize the motor so as to maintain constant velocity.

If the reeling operation should proceed at too rapid a rate, the potential at the terminal 134 and consequently at the input terminal 143 of the comparison circuit 141 would become positive with respect to the potential at the input terminal 142 of the circuit, and as a result there would appear at the terminal 144 a D.-C. voltage corresponding to an excess speed condition. This potential would be applied to the motor control 148 which would in turn decrease the speed of the motor.

In general the error signals at the terminal 144 corresponding to excess speed or less-than-desired speed will be positive or negative with respect to a reference potential, but of course this reference potential need not necessarily be ground or zero potential.

When the desired length of wire has passed the device, the counter 127 will have rotated the shaft 159 through a sufficient angle to cause the length control means 156 to energize the winding 155. As a result, the contactor 154 is lifted from the contacts 153, thereby de-energizing the motor, and stopping the reeling operation, as desired.

It is thus seen that the apparatus of Fig. 4 is capable of maintaining the linear velocity of the wire constant, as well as indicating this velocity, indicating the length of wire reeled by the apparatus, and stopping the reeling operation after the desired length of wire has been reeled.

After ferromagnetic wire has been passed through apparatus of the illustrative types described heretofore, the magnetized portions of the wire will tend to remain in a magnetized condition. If desired, these portions may be demagnetized by known methods, such as by subjecting them to a gradually decreasing alternating magnetic field. On the other hand, these magnetized portions may be allowed to remain in the wire and may be useful in later operations. Thus the wire may be wound up on a reel, and it may be of considerable advantage at a later time to be able to measure accurately a length of this wire. Such a measuring operation may be performed by passing the wire past an electromagnetic pick-up head connected to an amplifying circuit and a counter. For example, the apparatus of Fig. 2 might be employed for this subsequent operation, without the recorder head or the initiator. In this case the winding of the recorder 20 would be replaced by an ordinary lead or electrical connection from the resistor 32 to the winding 31 of the counter. Of course in order to calibrate the counter for this subsequent measuring operation, it would be necessary to take into account the distance separating the recorder and pick-up heads employed when the wire is first magnetized.

Throughout the present description it may be assumed that the wire or other material being measured is not stretched between the time it passes the recorder head and the time it passes the pick-up head.

In case a second pick-up head is employed to detect the magnetized spots at a later time, the length of the wire should not be altered between the time it is magnetized and the time these magnetized portions are detected by this second pick-up head.

While it is preferable to magnetize the wire in short elementary lengths in order that the power requirements of the recorder head may be small and more especially in order that the electrical signal derived by the pick-up head may be in the form of short pulses which lend themselves to amplification by A.-C. coupled amplifiers, the present invention is not necessarily limited to this mode of operation. Thus for example the wire might be magnetized by energizing the recorder head with a square-wave current, symmetrical about the zero axis. In other words, the entire length of the wire might be magnetized in such a way that alternate segments of equal length are magnetized with opposite magnetic polarity. The magnetic flux through the pick-up head would then have a square-wave variation, and a signal could be derived by the pick-up head adapted to control means for energizing the recorder head. The derived signal might be a square wave, or in case the time constants of the various circuits were short compared with the period of the signal energizing the recorder head, the signal derived from the pick-up head might comprise alternate positive and negative pulses corresponding to the moments when the polarity of the magnetic flux through this head changed. These alternate positive and negative pulses could be used to control means for energizing the recorder head.

It is also possible that the magnetizing currents of still different wave forms might be applied to the recorder head.

While the present invention has been described in its preferred form using electromagnetic recorder and pick-up heads, other modifications are possible. Thus the recorder head may comprise a device adapted to heat a spot on any elongated advancing material by radiant heat or otherwise. A pick-up head may then be used adapted to detect the hot spot on the wire as it passes. For example, such a pick-up head may comprise a thermocouple. The pick-up head generates an electrical signal which is amplified and applied to a repeater circuit, thereafter being applied to the recorder head to heat a succeeding spot on the wire. In such an embodiment the recorder head may comprise an electrically-operated radiant heater. In a system of this type, the pick-up and recorder heads should be located rather close to one another, and the wire should travel rather rapidly, since the hot spot on the wire must be detected before it has cooled too much.

Thus in more general terms, the recorder head may comprise means for creating a localized condition of molecular disturbance in spaced portions of the material being advanced, and the pick-up head may comprise means located at a subsequent point in the path of the material for detecting said condition and for deriving a cyclic signal in response to passage of said portions. These signals are repeated and employed to control the recorder head. By counting the cycles of the signals, the length of the material may be determined.

It will be noted that the apparatus of the present invention is capable of measuring rapidly advancing wire or other material without touching it. That is, the recorder head and pick-up head are preferably spaced from the wire, and they act on it from a distance. This feature is of some advantage in that the heads do not impede the rapid advance of the material. The invention would, however, operate satisfactorily even if the material comes into contact with the heads.

It may be further noted that the apparatus will measure the length of advancing material, regardless of whether the material advances continuously or intermittently.

While a suitable form of apparatus and method to be used in accordance with the invention have been described in some detail, and certain modifications have been suggested, it will be understood that numerous changes may be made without departing from the general principles and scope of the invention.

I claim:

Apparatus for producing a series of current pulses, comprising a single-shot, self-restoring multivibrator having an input terminal and an output circuit, a magnetic recorder head connected to said output circuit, a continuously-advancing filament of ferromagnetic material moving past said recorder head, said recorder head being adapted, when energized by said multivibrator, to magnetize elementary portions of said filament, a magnetic pick-up head located in the path of said advancing filament subsequent to the position of said recorder head, a capacitor, a source of charging potential, relay means responsive to said pick-up head adapted to switch said capacitor first to said source of charging potential and then to said input terminal of said multivibrator for firing said multivibrator, and a resistor providing a discharge path for said capacitor of sufficiently low resistance that said multivibrator will fire only once each time said capacitor is connected to its input terminal, whereby said capacitor is switched back and forth at a rate determined by the speed of advance of said filament, in order to determine the repetition rate of said pulses.

ROBERT J. COLE.
EDWARD M. YARD.

(References on following page)

REFERENCES CITED

The following references are of record in the file of this patent:

UNITED STATES PATENTS

| Number | Name | Date |
|---|---|---|
| 1,721,375 | De Koning | July 16, 1929 |
| 2,259,904 | McNamee et al. | Oct. 21, 1941 |
| 2,277,579 | Burger et al. | Mar. 24, 1942 |
| 2,325,927 | Wilbur | Aug. 3, 1943 |
| 2,332,797 | Hume | Oct. 26, 1943 |
| 2,351,595 | Bindschedler et al. | June 20, 1944 |
| 2,390,608 | Miller et al. | Dec. 11, 1945 |
| 2,401,280 | Walstrom | May 28, 1946 |
| 2,416,158 | Coykendall | Feb. 18, 1947 |
| 2,439,446 | Begun | Apr. 13, 1948 |
| 2,466,251 | Martin | Apr. 5, 1949 |
| 2,493,028 | Putt | Jan. 3, 1950 |
| 2,559,849 | Covert | July 10, 1951 |